(12) United States Patent  (10) Patent No.: US 7,110,722 B2
Godsill et al.  (45) Date of Patent: Sep. 19, 2006

(54) METHOD FOR EXTRACTING A SIGNAL

(75) Inventors: Simon Godsill, Cambridge (GB); Christophe Andrieu, Villejuif (FR)

(73) Assignee: AT&T Laboratories-Cambridge Limited, Cambridgeshire (GB)

( * ) Notice: Subject to any disclaimer, the term of this patent is extended or adjusted under 35 U.S.C. 154(b) by 395 days.

(21) Appl. No.: 10/311,107

(22) PCT Filed: Jun. 14, 2001

(86) PCT No.: PCT/GB01/02666

§ 371 (c)(1),
(2), (4) Date: Jun. 13, 2003

(87) PCT Pub. No.: WO01/97415

PCT Pub. Date: Dec. 20, 2001

(65) Prior Publication Data

US 2004/0014445 A1  Jan. 22, 2004

(51) Int. Cl.
*H04B 17/00* (2006.01)
(52) U.S. Cl. .................. 455/67.13; 381/94.2; 704/231
(58) Field of Classification Search ............ 455/67.11, 455/67.13, 67.15; 381/94.2, 94.3; 704/231, 704/232, 233
See application file for complete search history.

(56) References Cited

U.S. PATENT DOCUMENTS 5,581,580 A  12/1996  Lindbom et al.
5,845,208 A  12/1998  Hottinen et al.
5,870,001 A  2/1999  Österling et al.
6,691,073 B1 *  2/2004  Erten et al. .................. 702/190

FOREIGN PATENT DOCUMENTS

WO    WO 99/66638    12/1999

OTHER PUBLICATIONS

Benjamin, "Signal processing principles for systems analysis and design", *Electronics & Communication Engineering Journal*, Dec. 1992, pp. 373-382.
Kotecha et al., "Sequential Monte Carlo Sampling Detector for Rayleigh Fast-Fading Channels", *2000 IEEE International Conference of Acoustics, Speech, and Signal Processing*, Jun. 2000, pp. 61-64.
Lin et al., "State space model and noise filtering design in transmultiplexer systems", *Signal Processing 43*, 1995, pp. 65-78.
Salam et al., "The State Space Framework for Blind Dynamic Signal Extraction and Recovery", *Proceedings of the 1999 IEEE International Symposium on Circuits and Systems VLSI*, Jun. 1999, pp. 66-69.

* cited by examiner

*Primary Examiner*—Lee Nguyen
(74) *Attorney, Agent, or Firm*—Hoffmann & Baron,LLP

(57) ABSTRACT

A method is provided of extracting desired signals $s_t$ from contaminated signals $y_t$ measured via respective communication channels. The system comprising the desired signals $s_t$ and the channels is modelled as a state space model. In the model, the desired signals have time-varying characteristics which vary more quickly than second time-varying characteristics of the channels.

130 Claims, 2 Drawing Sheets

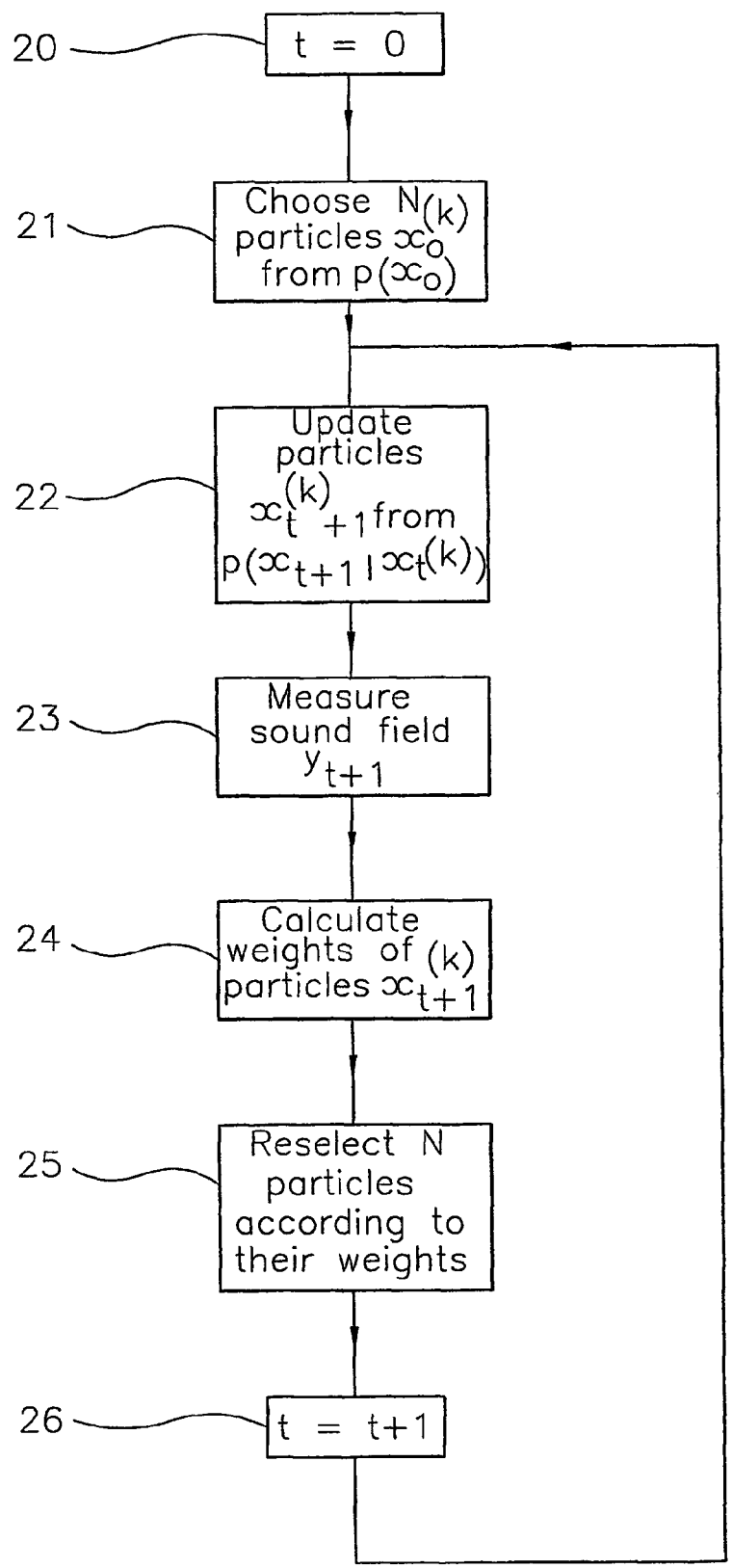
FIG_3

METHOD FOR EXTRACTING A SIGNAL

CROSS-REFERENCE TO RELATED APPLICATIONS

This application is the national stage filing under 35 U.S.C.§371 of PCT Application No. PCT/GB01/02666, filed on Jun. 14, 2001; and GB 0014636.5, filed on Jun. 16, 2000.

BACKGROUND OF THE INVENTION

The present invention relates to a method of extracting a signal. Such a method may be used to extract one or more desired signals from one or more contaminated signals received via respective communications channels. Signals may, for example, be contaminated with noise, with delayed versions of themselves in the case of multi-path propagation, with other signals which may or may not also be desired signals, or with combinations of these.

The communication path or paths may take any form, such as via cables, electromagnetic propagation and acoustic propagation. Also, the desired signals may in principle be of any form. One particular application of this method is to a system in which it is desired to extract a sound signal such as speech from contaminating signals such as noise or other sound signals, which are propagated acoustically.

WO 99/66638 discloses a signal separation technique based on state space modelling. A state space model is assumed for the signal mixing process and a further state space model is designed for an unmixing system. There is a suggestion that the communication environment for the signals may be time-varying, but this is not modelled in the disclosed technique.

U.S. Pat. No. 5,870,001 discloses a calibration technique for use in cellular radio systems. This technique is a conventional example of the use of Kalman filters.

U.S. Pat. No. 5,845,208 discloses a technique for estimating received power in a cellular radio system. This technique makes use of state space auto regressive models in which the parameters are fixed and estimated or "known" beforehand.

U.S. Pat. No. 5,581,580 discloses a model based channel estimation algorithm for fading channels in a Rayleigh fading environment. The estimator uses an auto regressive model for time-varying communication channel coefficients.

Kotecha and Djuric, "Sequential Monte Carlo sampling detector for Rayleigh fast-fading channel", Proc. 2000 IEEE Int. Conf. Acoustics Speech and Signal Processing, Vol. 1, pages 61–64 discloses a technique for processing digital or discrete level signals. This technique makes use of modelling the system as a dynamic state space model in which channel estimation and detection of transmitted data are based on a Monte Carlo sampling filter. Channel fading coefficients and transmitted variables are treated as hidden variables and the channel coefficients are modelled as an autoregressive process. Particles of the hidden variables are sequentially generated from an importance sampling density based on past observations. These are propagated and weighted according to the required conditional posterior distribution. The particles and their weights provide an estimate of the hidden variables. This technique is limited to modelling of sources with fixed parameters.

Chin-Wei Lin and Bor-Sen Chen, "State Space Model and Noise Filtering Design in Transmultiplexer Systems", Signal Processing, Vol. 43, No. 1, 1995, pages 65–78 disclose another state space modelling technique applied to communication systems. In a "transmultiplexer" scheme, desired signals are modelled as non-time-varying autoregressive processes with known and fixed parameters.

SUMMARY OF THE INVENTION

According to a first aspect of the invention, there is provided a method of extracting at least one desired signal from a system comprising at least one measured contaminated signal and at least one communication channel via which the at least one contaminated signal is measured, comprising modelling the at least one desired signal as a first dynamical state space system with at least one first time-varying parameter and modelling the at least one communication channel as a second state space system having at least one second parameter.

State space systems are known in mathematics and have been applied to the solution of some practical problems. In a state space system, there is an underlying state of the system which it is desired to estimate or extract. The state is assumed to be generated as a known function of the previous state value and a random error or disturbance term.

The available measurements are also assumed to be a known function of the current state and another random error or noise term.

It has been surprisingly found that a state space system may be successfully applied to the problem of extracting one or more desired signals from a system comprising one or more measured contaminated signals and communication channels. This technique makes possible the extraction of one or more desired signals in a tractable way and in real time or on-line. A further advantage of this technique is that future samples are not needed in order to extract the samples of the desired signal or signals although, in some embodiments, there may be an advantage in using a limited selection of future samples. In this latter case, the samples of the desired signal or signals are delayed somewhat but are still available at at least the sampling rate of the measured signals and without requiring very large amounts of memory.

The at least one desired signal may be generated by a physical process. The at least one first parameter may model the physical generation process. Although such modelling generally represents an approximation to the actual physical process, this has been found to be sufficient for signal extraction.

The at least one second parameter may be fixed and unknown. The at least one second parameter may be time-varying. The at least one first time-varying parameter may have a rate of change which is different from that of the at least one second time-varying parameter. The rate of change of the at least one first time-varying parameter may, on average, be greater than that of the at least one second time-varying parameters.

For many systems, the characteristics of the desired signal or signals vary relatively rapidly whereas the characteristics of the communication channel or channels vary more slowly. Although there may be abrupt changes in the channel characteristics, such changes are relatively infrequent whereas signals such as speech have characteristics which vary relatively rapidly. By modelling these characteristics in such a way that the different rates of variation are modelled, the extraction of one or more signals is facilitated.

The at least one desired signal may comprise a plurality of desired signals, each of which is modelled as a respective state space system. At least one but not all of the plurality of desired signals may be modelled with at least one third parameter, the or each of which is fixed and unknown.

At least one but not all of the plurality of desired signals may be modelled with at least one fourth parameter, the or each of which is known.

The or each second parameter may be known.

The at least one communication channel may comprise a plurality of communication channels and the at least one contaminated signal may comprise a plurality of contaminated signals. The at least one desired signal may comprise a plurality of desired signals. The number of communication channels may be greater than or equal to the number of desired signals. Although it is not necessary, it is generally preferred for the number of measured signals to be greater than or equal to the number of desired signals to be extracted. This improves the effectiveness with which the method can recreate the desired signal and, in particular, the accuracy of reconstruction or extraction of the desired signal or signals.

The at least one contaminated signal may comprise a linear combination of time-delayed versions of at least some of the desired signals. The method is thus capable of extracting a desired signal in the case of multi-path propagation, signals contaminating each other, and combinations of these effects.

The at least one contaminated signal may comprise the at least one desired signal contaminated with noise. Thus, the method can extract the or each desired signal from noise. The at least one channel may comprise a plurality of signal propagation paths of different lengths.

The at least one desired signal may comprise an analog signal. The analog signal may be a temporally sampled analog signal.

The at least one desired signal may comprise a sound signal. The at least one sound signal may comprise speech. The contaminated signals may be measured by spatially sampling a sound field. The at least one first parameter may comprise a noise generation modelling parameter. The at least one first parameter may comprise a formant modelling parameter. For example, acousto-electric transducers such as microphones may be spatially distributed in, for example, a room or other space and the output signals may be processed by the method in order to extract or separate speech from one source in the presence of background noise or signals, such as other sources of speech or sources of other information-bearing sound.

The at least one desired signal may be modelled as a time-varying autoregression. This type of modelling is suitable for many types of desired signal and is particularly suitable for extracting speech. As an alternative, the at least one desired signal may be modelled as a moving average model. As a further alternative, the at least one desired signal may be modelled as a non-linear time-varying model.

The at least one communication channel may be modelled as a time-varying finite impulse response model. This type of model is suitable for modelling a variety of propagation systems. As an alternative, the at least one communication channel may be modelled as an infinite impulse response model. As a further alternative, the at least one communication channel may be modelled as a non-linear time-varying model.

The first state space system may have at least one parameter which is modelled using a probability model. The at least one desired signal may be extracted by a Bayesian inversion. As an alternative, the at least one desired signal may be extracted by maximum likelihood. As a further alternative, the at least one desired signal may be extracted by at least squares fit. The signal extraction may be performed by a sequential Monte Carlo method. As an alternative, the signal extraction may be performed by a Kalman filter or by an extended Kalman filter. These techniques are particularly effective for complex models and are potentially implementable on parallel computers.

According to a second aspect of the invention, there is provided a program for controlling a computer to perform a method as claimed in any one of the preceding claims.

According to a third aspect of the invention, there is provided a carrier containing a program in accordance with the second aspect of the invention.

According to a fourth aspect of the invention, there is provided a computer programmed by a program according to the second aspect of the invention.

BRIEF DESCRIPTION OF THE DRAWINGS

The invention will be further described, by way of example, with reference to the accompanying drawings, in which:

FIG. 3 is a flow diagram illustrating a method constituting an embodiment of the invention.

DETAILED DESCRIPTION OF THE INVENTION

Figure 1:
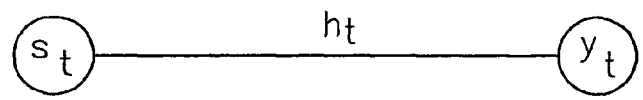
FIG. 1 is a diagram illustrating a signal source and a communication channel.

In order to extract a desired signal, a parametric approach is used in which the data are assumed to be generated by an underlying unobserved process described at time t with the variable $x_t$. The variable $x_t$ contains information concerning the waveforms of the different sources. The problem of extracting a desired signal may be too complex for a good deterministic model to be available, as little is known concerning the real structure of the problem. Alternatively, if a good deterministic model is available, this may lead to a large set of intractable equations.

The models for the way sound is generated give expressions for the likely distribution of the current 'state' $x_t$ given the value of the state at the previous time step $x_{t-1}$. This probability distribution (known as the state transition distribution, or 'prior') is written as $p(x_t|x_{t-1})$. How the current observed data depend on the current state is specified through another probability distribution $p(y_t|x_t)$ (known as the observation distribution, or 'likelihood'). Finally, how the state is likely to be distributed at the initial time instant is specified by $p(x_0)$. Specific forms for these three distributions are given later. A solution to circumvent the problems mentioned earlier comprises introducing uncertainty in the equations through probability distributions. More precisely this means that, instead of assuming, in a discrete time set-up, that $x_{t+1}$ is a deterministic function of past values e.g. $x_{t+1}=Ax_t$ where A is a linear operator, the plausible regions of the state space where the parameter can lie are described with a conditional probability distribution $p(x_{t+1}=\chi|x_t)$, the probability of $x_{t+1}$ being equal to $\chi$ given the previous value $x_t$. This may be expressed, for example, as $x_{t+1}=Ax_t+v_t$, where $v_t$ is an uncertainty or error distributed according to a Gaussian distribution around zero. The way the distribution is spread indicates the degree of confidence in the deterministic component $Ax_t$; the narrower the spread, the greater the confidence. This type of modelling proves to be robust in practice to describe very complex processes while being simple enough to be used in practice.

As mentioned above, whereas the structure of the process is assumed known (because of plausible physical assumptions), the variable $x_t$ is not observed and solely observations $y_t$ are available. In general, the observation mechanism, i.e. the transformations that the process of interest undergoes before being observed, will depend on the variable $x_t$, but again some randomness needs to be incorporated in the description of the phenomenon, for example to take into account observation noise. Again this is done by means of a probability distribution $p(y_t=y|x_t)$, the probability of $y_t$ being equal to y given that the parameters of the underlying process are represented by $x_t$. In the previous example, a possible observation process is of the form $y_t=Cx_t+w_t$, that is some transformation of the parameter $x_t$ describing the internal state of the process corrupted by an additive observation noise $w_t$.

In the case of audio source separation, the parameter $x_t$ contains the value $s_t$ of the desired waveforms of the sources at time t and the evolving parameters of the sources $(a_t)$ and the mixing system $(h_t)$. This is illustrated diagrammatically in FIG. 1 for a single communication channel. Transition probability distributions are defined by:

$$p(a_{t+1}=a|a_t)$$

$$p(h_{t+1}=h|h_t)$$

and as it is not known how to characterize this evolution, apart from the fact that $a_t$ is expected to evolve rapidly compared to $h_t$ (which might also evolve abruptly, but this is expected to happen rarely):

$$a_{t+1}=a_t+v_t^a$$

$$h_{t+1}=h_t+v_t^h$$

where the distributions of $v_t^a$, $v_t^h$ are each isotropic, but have a different spread to reflect the different non-stationarity time scales. The set of the parameters at may be thought of as evolving spectral characteristics of the sources and the parameters $h_t$ as classical finite impulse response (FIR) filters. Now that the parameters of the system are described, the waveforms may be assumed to evolve according to a probability distribution:

$$p(s_{t+1}=s|s_t, a_t)$$

which describes the model of the sources.

One example of audio signal separation or extraction is where the sources are speech sources. The parameter $x_t$ may then be modelled as a time-varying autoregressive process, for example by the expression:

$$x_t = \sum_{i=1}^{p} a_{i,t} \cdot x_{t-i} + e_t$$

where the parameters $a_{i,t}$ are filter coefficients of an all-resonant filter system representing the human vocal tract and $e_t$ represents noise produced by the vocal cords.

Figure 2:
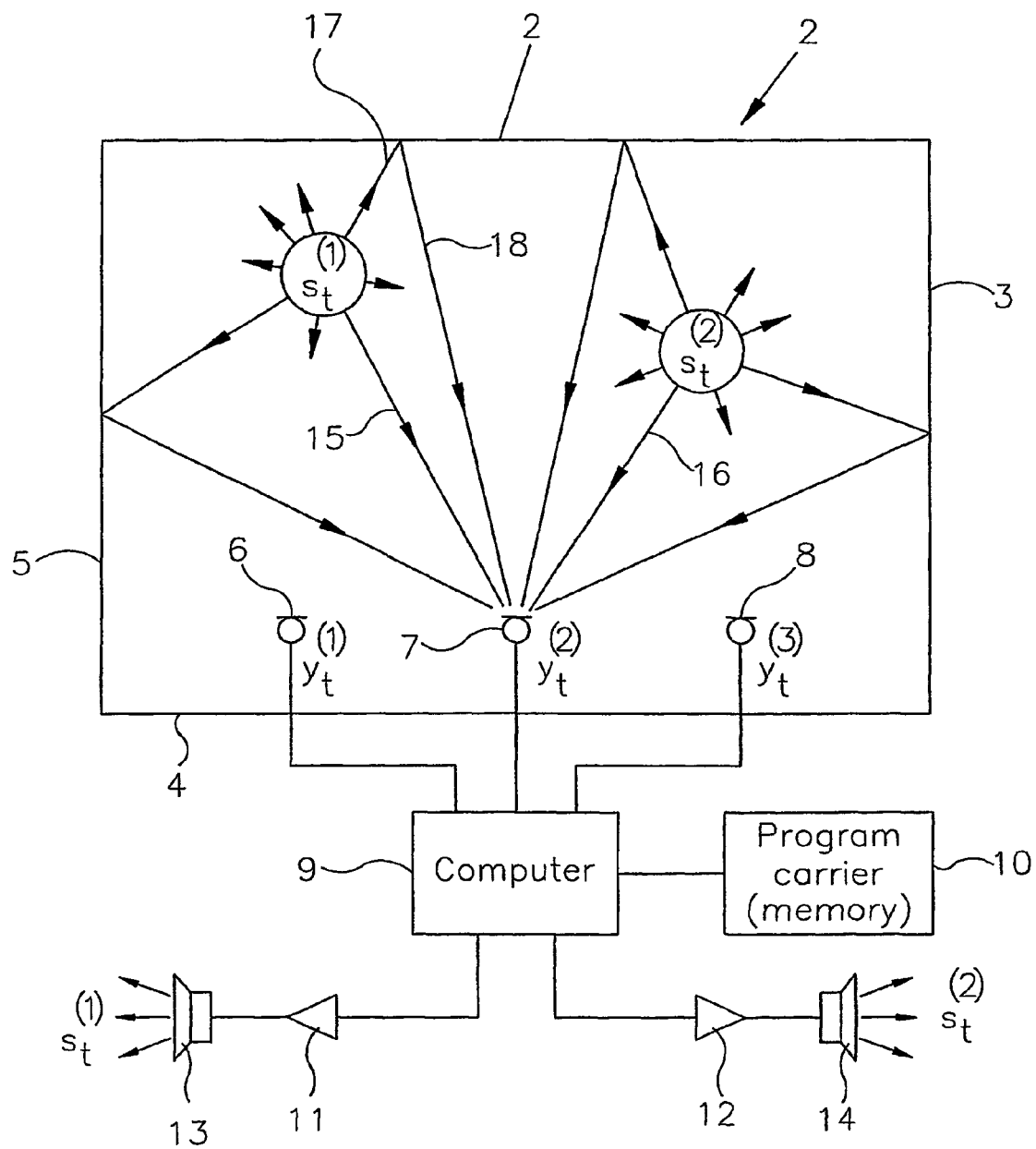
FIG. 2 is a diagram illustrating audio sound sources in a room and an apparatus for performing a method constituting an embodiment of the invention.

FIG. 2 illustrates a typical application of the present method in which two desired sound sources, such as individuals who are speaking, are represented by $s^{(1)}_t$ and $s^{(2)}_t$ located in an enclosed space in the form of a room 1 having boundaries in the form of walls 2 to 5. Microphones 6 to 8 are located at fixed respective positions in the room 1 and sample the sound field within the room to produce measured contaminated signals $y^{(1)}_t$, $y^{(2)}_t$, $y^{(3)}_t$. The measured signals are supplied to a computer 9 controlled by a program to perform the extraction method. The program is carried by a program carrier 10 which, in the example illustrated, is in the form of a memory for controlling the operation of the computer 9. The computer extracts the individual speech signals and is illustrated as supplying these via separate channels comprising amplifiers 11 and 12 and loudspeakers 13 and 14. Alternatively or additionally, the extracted signals may be stored or subjected to further processing.

FIG. 2 illustrates some of the propagation paths from the sound sources to one of the microphones 7. In each case, there is a direct path 15, 16 from each sound source to the microphone 7. In addition, there are reflected paths from each sound source to the microphone 7. For example, one reflected path comprises a direct sound ray 17 from the source which is reflected by the wall 2 to form a reflected ray 18. In general, there are many reflected paths from each sound source to each microphone with the paths being of different propagation lengths and of different sound attenuations.

The objective is to estimate the sources st given the observations $y_t$ and, to be of practical use, it is preferable for the estimation to be performed on line with as little delay as possible. Whereas the modelling process describes the causes $(x_t)$ that will result in effects (the observations $y_t$), the estimation task comprises inverting the causes and the effects. In the framework of probability modelling, this inversion can be consistently performed using Bayes' theorem. In the context of statistical filtering, that is the computation of the probability of $x_t$ given all the observations up to time t, namely $p(x_t|y_{1:t})$, given the evolution probability $p(x_t|x_{t-1})$ and the observation probability $p(y_t|x_t)$, the application of Bayes' rule yields $$p(x_t|y_{1:t}) = \frac{\int p(y_t|x_t)p(x_t|x_{t-1})p(x_{t-1}|y_{1:t-1})dx_{t-1}}{p(y_t|y_{1:t-1})}$$

This equation is fundamental as it gives the recursion between the filtering density at time t−1, i.e. $p(x_{t-1}|y_{1:t-1})$, and the filtering density at time t, $p(x_t|y_{1:t})$. The problem is that, in practice, the integral cannot be computed in closed-form and it is desired to compute these quantifies in an on-line or real time manner.

Whereas the use of probability distributions can be viewed as a way of representing in a parsimonious way the concentration of members of a population in certain regions of their feature space, Monte Carlo methods work in the opposite direction and rely on the idea that a probability distribution can be represented with an artificially generated set of samples distributed according to this distribution. This requires that the concentration of the samples in a given zone of the space of features is assumed to be representative of the probability of this zone under the distribution of interest. As expected, the larger the population, the more accurate the representation is. This approach possesses the advantage in many cases of greatly simplifying computation, which can to a large extent be performed in parallel.

The following represents a basic explanation of the techniques involved in the present method. This is followed by a detailed description of a specific embodiment.

It is assumed that, at time t−1, there are N>>1 members of a population of "particles"

$$x_{t-1}^{(i)}$$

distributed according to the distribution $p(x_{t-1}|y_{1:t-1})$. Then it is possible to guess where the particles are going to evolve using the evolution distribution $p(x_t|x_{t-1})$ or prior, from which it is typically easy to sample. Thus, 'scouts' are being sent into the regions which are likely, according to the prior on the evolution of the parameters. When the next observation $y_t$ is available, the prediction needs to be corrected as the 'scouts' did not take into account the information brought by the new observation which can be quantifyied with $p(y_t|x_t)$. Some of the particles will be in regions of interest but typically insufficient numbers, or there might also be too many members of the population in regions where many less should be.

A way of regulating the population consists of multiplying members in underpopulated regions and suppressing members in overpopulated regions. This process is referred to as a selection step. It can be proved mathematically that the quantity that will decide the future of a 'scout' is the importance function:

$$w_t^{(i)} = \frac{p(y_t | x_t^{(i)})}{\sum_{j=1}^{N} p(y_t | x_t^{(j)})}$$

and valid mechanisms include taking the nearest integer number to $$Nw_t^{(i)}$$

to determine the number of "children" of scout number i or randomly choosing the particle $$x_t^{(i)}$$

with probability $$w_t^{(i)}.$$

After the selection process, the children are approximately distributed according to $p(x_t|y_{1:t})$ and the next data can be processed. This is a very general description of the algorithm, and many improvements are possible as described hereinafter for a very specific case.

A general recipe for how to do sequential Monte Carlo estimation is given. This is the most basic form of the method and is described in N. J. Gordon, D. J. Salmond and A. F. M. Smith, "Novel approach to nonlinear/non-Gaussian Bayesian state estimation", IEE Proceedings-F, vol. 140, no. 2, pp. 107–113, 1993, the contents of which are incorporated herein by reference.

In an initial step 20, time t is set to zero. N so-called "particles" are randomly chosen from the initial distribution $p(x_0)$ and labelled $x^{(k)}_0$, where k is an integer from 1 to N. The number N of particles is typically very large, for example of the order of 1,000. The steps 20 and 21 represent initialisation of the procedure.

State propagation is performed in a step 22. In this step, for each particle from the current time t=1, an update to the current time is randomly chosen according to the distribution $p(x_{t+1}|x^{(k)}_t)$. The updated particles $x^{(k)}_{t+1}$ have plausible values which lie in the expected region of the space according to the state transition distribution.

In a step 23, the next measured value $y_{t+1}$ is obtained from measuring or sampling the sound field. In a step 24, the weights of the particles are calculated. Because the updated particles $x^{(k)}_{t+1}$ were generated without reference to the new measurement $y_{t+1}$, it is necessary to calculate a weight between zero and one for each particle representing how "good" each particle actually is in the light of the new measurement. The correct weight value for each particle is proportional to the value of the observation distribution for the particle. However, the sum of all of the weights is required to be equal to one. Accordingly, the weight of each particle $x^{(k)}_{t+1}$ is given by:

$$w_{t+1}^{(k)} = \frac{p(y_{t+1} | x_{t+1}^{(k)})}{\sum_{j=1}^{N} p(y_{t+1} | x_{t+1}^{(j)})}$$

A step 25 then reselects or resamples the particles in order to return to a set of particles without attached weights. The step 25 reselects N particles according to their weights as described in more detail hereinafter. A step 26 then increments time and control returns to the step 22. Thus, the steps 22 to 26 are repeated for as long as the method is in use.

The value of each sample may, for example, be calculated in accordance with the posterior mean estimator as:

$$\sum_i w_{t+1}^{(i)} \cdot x_{t+1}^{(i)}$$

The techniques described hereinbefore are relatively general and are not particularly limited to the case of separating or extracting speech or other audio signals from "contaminated" measurements. A method directed more explicitly to extracting audio source signals will now be described in greater detail.

The sources are assumed to be modelled with time varying autoregressive processes, i.e. source number i at time t is a linear combination of $p_i$ (the so-called order of the model) past values of the same source ($s_{i,t-1}, \ldots, s_{i,t-p_i}$, or in short and vector form $s_{i,t-1:t-p_i}$) perturbed by a noise, here assumed Gaussian, $$v_{i,t}^s:$$

$$s_{i,t} = a_{i,t}^T s_{i,t-1:t-p_i} + v_{i,t}^s \qquad (1)$$

This type of process is very flexible and allows for resonances to be modelled. The coefficients $a_{i,t}$ of the linear combination, are time-varying in order to take into account the non-stationarity of the resonances of speech:

$$a_{i,t+1} = a_{i,t} + v^a_{i,t+1} \qquad (2)$$

The observations, which consist of the superimposition of the different sources (possibly delayed) at microphone j at time t are assumed generated by the following process $$y_{j,t} = \sum_{i=1}^{n} h^T_{i,j,t} s_{i,t:t-l_{ij}+1} + w_{j,t} \qquad (3)$$

i.e. the observation is the sum over all the sources of filtered versions of the sources (the filter is of length $l_{ij}$ from source i to microphone j, and introduces delays) perturbed by an observation noise $w_{j,t}$. The transfer function from source i to microphone j evolves in time according to the equation $$h_{i,j,t+1} = h_{i,j,t} + v^h_{i,j,t+1}$$

It is assumed that the characteristics of $$v^a_{i,t+1}$$

and $w_{j,t}$ are known, whereas in the full version of the algorithm these parameters are also estimated.

The steps in the sequential Monte Carlo algorithm for audio source separation are essentially as shown in FIG. 3 but are changed or augmented as described hereinafter. The state vector $x_t$ is defined as a stacked vector containing all the sources, autoregressive parameters and transfer functions between sources and microphones.

The initial values are randomly chosen from a normal distribution with a large spread In the step 22, random noise $v^{a(k)}_{i,t+1}$, $v^{s(k)}_{i,t+1}$ and $v^{h(k)}_{i,j,t+1}$ are generated from Gaussian distributions, for example as disclosed in B. D. Ripley, "Stochastic Simulation", Wiley, N.Y. 1987, the contents of which are incorporated herein by reference. These quantities are then added to their respective state variables:

$$a^{(k)}_{i,t+1} = a^{(k)}_{i,t} + v^{a(k)}_{i,t+1}$$
$$s^{(k)}_{i,t+1} = a^{(k)}_{i,t+1} s^{(k)}_{i,t:t-p_i-1} + v^{s(k)}_{i,t+1}$$
$$h^{(k)}_{i,j,t+1} = h^{(k)}_{i,j,t} + v^{h(k)}_{i,j,t+1}$$

The step 24 calculates un-normalised weights as follows:

$$w^{(k)}_{t+1} = \exp\left(\frac{-1}{2\sigma^2_w}\left(y_{1,t+1} - \sum_{i=1}^{n} h^{(k)T}_{1,1,t} s^{(k)}_{i,t:t-1_{ik}+1}\right)^2\right) \times \cdots \times$$
$$\exp\left(\frac{-1}{2\sigma^2_w}\left(y_{n,t+1} - \sum_{i=1}^{n} h^{(k)T}_{i,n,t} s_{i,t:t-l_{i,n}+1}\right)^2\right)$$

The weights are then renormalised in accordance with the expression:

$$w^{(k)}_{t+1} = \frac{w^{(k)}_{t+1}}{\sum_{j=1}^{N} w^{(j)}_{t+1}}$$

The variability of the variances of the excitation noise and the observation noise may be taken into account by defining evolution equations on the $$\phi_{j,t+1,w} = \log(\sigma^2_{j,t+1,w}) \text{ and } \phi_{j,t+1,v} = \log(\sigma^2_{j,t+1,v}) \text{ as follows}$$
$$\phi_{w,j,t+1} = A^{\phi_w}_j \phi_{v,j,t} + B^{\phi_w}_j v^{\phi_w}_{j,t+1}$$
$$\phi_{v,j,t+1} = A^{\phi_v}_j \phi_{v,j,t} + B^{\phi_v}_j v^{\phi_v}_{j,t+1}$$
where $v^{\phi_w}_{j,t+1}$ and $v^{\phi_v}_{j,t+1}$ are i.i.d. sequences distributed according to Gaussian distributions.

It is then possible to improve the performance with some or all of several modifications to the basic algorithm as follows:

(a) Estimation of the time-varying noise variances. Generate random noise $$v^{\phi_w}_{i,t+1}, v^{\phi_v}_{i,t+1}$$

from normal distributions and compute $$\phi_{w,j,t+1} = A^{\phi_w}_j \phi_{w,j,t} + B^{\phi_w}_j v^{\phi_w}_{j,t+1}$$
$$\phi_{v,j,t+1} = A^{\phi_v}_j \phi_{v,j,t} + B^{\phi_v}_j v^{\phi_v}_{j,t+1}$$

which are transformed with an exponential to obtain the variances of the noises, i.e.

$$\sigma^2_{w,j,t+1} = \exp(\phi_{w,j,t+1}) \text{ and } \sigma^2_{v,j,t+1} = \exp(\phi_{v,j,t+1}).$$

(b) By using the structure of the model, the mixing filter coefficients and the autoregressive coefficients can be integrated out. The implication is that the calculation of the weight is modified to $$w^{(k)}_{t+1} = p(y_t | x^{(k)}_{1:t}, \sigma^{2(k)}_{1:t,1:m,v}, \sigma^{2(k)}_{1:t,1:n,w})$$

This weight is calculated sequentially by use of a standard procedure, the Kalman filter, (see equation (50)) applied to the state space model for which the state consists of the autoregressive coefficients and mixing filter coefficients shown in the following equations (17) to (19). The advantage of this method is that the number of parameters to be estimated is significantly reduced and the statistical efficiency is much improved.

(c) The distribution that propagates the values of the sources is modified to an approximation of the filtering density $$p(x_t \mid y_{1:t}, \hat{a}_{1:t}, \hat{h}_{1:t}, \sigma^2_{1:t,1:m,w}, \sigma^2_{1:t,1:n,w}),$$

which, in contrast to the basic algorithm, takes into account the new observation $y_t$, hence leading to improved statistical efficiency once again. This density is the byproduct of a Kalman filter (say Kalman filter #2) applied to a state space model for which the state consists of the sources $x_t$ and the parameters shown in the following equation (14) depend upon the filtered mean estimate of the mixing coefficients ĥ and autoregressive coefficients â, previously obtained from Kalman filter #1

(d) Diversity among the particles is introduced by using a Metropolis-Hastings update on the particle whose target distribution is $$p(d(x_j, \sigma^2_{j,1:m,v}, \sigma^2_{j,1:n,w})_{j=0,\ldots t} \mid y_{1:t})$$

This step is introduced after the step 25 and the details are given hereinafter.

(e) Estimation is delayed for improvement purposes, i.e. to compute the value of the sources at time t, wait and take into account some future observations $y_{t+1}, \ldots, y_{t+L}$ for some L. Such a technique is called fixed-lag smoothing and does not modify the algorithm as it is merely necessary to wait for the data $y_{t+1}$ The full details of these different steps are given hereinafter.

The whole system including sources and channels is modelled as a state space system, a standard concept from control and signal processing theory. The definition of a state space system is that there is some underlying state in the system at time t, denoted $x_t$, which it is desired to estimate or extract. In the present case, this comprises the underlying desired sources themselves. The state is assumed to be generated as a known function of the previous state value and a random error or disturbance term:

$$x_{t+1} = A_{t+1}(x_t, v^x_{t+1})$$

where $A_{t+1}(\ldots)$ is a known function which represents the assumed dynamics of the state over time. Similarly the measurements at time t, denoted $y_t$, are assumed to be a known function of the current state and another random error or noise term:

$$y_t = C^x_t(x_t, w^x_t)$$

where $C^x_t(\ldots)$ is a known function representing the contaminating process. In the present case, $C^x_t(\ldots)$ represents the filtering effects of the channel(s) on the source(s) and $w^x_t$ represents the measurement noise in the system.

A key element of the present method is that both the source(s) and channel(s) have different time-varying characteristics which also have to be estimated. In other words, the functions $A_{t+1}$ and $C^x_t$ themselves depend upon some unknown parameters, say $\theta^A_t$ and $\theta^C_t$. In the present case, $\theta^A_t$ represents the unknown time-varying autoregressive parameters of the sources and $\theta^C_t$ represents the unknown time-varying finite impulse response filter(s) of the channel(s).

These time varying characteristics are modelled with additional state transition functions, as described below.

The problem addressed is the problem of source separation, the n sources being modelled as autoregressive (AR) processes, from which, at each time t, there are m observations which are convolutive mixtures of the n sources. Source i can be modelled for $t=1, \ldots$ as:

$$s_{i,t} = a^T_{i,t} s_{i,t-1:t-p_i} + \sigma_{v,i,t} v^s_{i,t} \tag{4}$$

and $p_i$ is the order of the $i^{th}$ AR model. It is assumed that $s_{i,-P_i+1:0} \sim N(m^s_0, P^s_0)$ for $i=1, \ldots, n$.

$$(v^s_{i,t})_{t=1\ldots}$$

is a zero mean normalized i.i.d. Gaussian sequence, i.e. for $i=1, \ldots, n$ and $t=1, \ldots$ $$v^s_{i,t} \overset{i.i.d}{\sim} N(0, 1) \tag{5}$$

The $(\sigma^2_{v,i,t})_{i=1,\ldots,n}$ are the variances of the dynamic noise for each source at time t. It is assumed that the evolving autoregressive model follows a linear Gaussian state-space representation, $$a_{i,t+1} = A^a_i a_{i,t} + B^a_i v^a_{i,t+1} \tag{6}$$

$$\phi_{v,i,t+1} = A^{\phi_v}_t \phi_{v,i,t} + B^{\phi_v}_i v^{\phi_v}_{i,t+1}$$

with $\phi_{v,i,t} \triangleq \log(\sigma^2_{v,i,t})$, $$v^a_{i,t} \overset{i.i.d}{\sim} N(O_p, I_{p_i}) \text{ and } v^{\phi_v}_{i,t} \overset{i.i.d}{\sim} N(0, 1) \tag{7}$$

and $a_{i,0} \sim N(m^a_o, P^a_o)$. The model may include switching between different sets of matrices $A^a_i$, $B^a_i$ to take into account silences, for example. Typically $A^a_i = I_{p_i}$ and $B^a_i \propto I_{p_i}$ The mixing model is assumed to be a multidimensional time varying FIR filter. It is assumed that the sources are mixed in the following manner, and corrupted by an additive Gaussian i.i.d. noise sequence. At the jth sensor, and for $j=1, \ldots, m$:

$$y_{j,t} = \sum_{i=1}^{n} h_{i,j,t} s_{i,t:t-l_{ij}+1} + \sigma_{w,j,t} w_{j,t} \tag{8}$$

where $l_{ij}$ is the length of the filter from source i to sensor j. The series $(w_{j,t})_{t=1} \ldots$, is a zero mean normalized i.i.d. Gaussian sequence, i.e. for $j=1, \ldots, n$ and $t=1, \ldots$ $$w_{j,t} \overset{i.i.d}{\sim} N(0, 1) \tag{9}$$

$$(\sigma^2_{w,j,t})_{j=1,\ldots,m}$$

are the variances of the observation noise for each sensor at time t. The $w_{j,t}$ are assumed independent of the excitations of the AR models. The constraint $[h_{i,j,t}]_{1,i}=1$ and $[h_{i,j,t}]_{k,1}=0$ for j=i mod m and i=1, ..., n are imposed. In the case m=n, this constraint corresponds to $[h_{i,j,t}]_{1.1}=1$ and $[h_{i,j,t}]_{k,1}=0$ for j=i. As for the model of the sources, it is assumed that the observation system also follows a state-space representation. Writing $$\phi_{w,j,t} \overset{\Delta}{=} \log(\sigma^2_{w,j,t}):$$

$$h_{i,j,t+1} = A^h_{i,j} h_{i,j,t} + B^h_{i,j} v^h_{i,j,t+1}$$

$$\phi_{w,j,t+1} = A^{\phi_w}_j \phi_{w,j,t} + B^{\phi_w}_j v^{\phi_w}_{j,t+1} \qquad (10)$$

with $$v^h_{i,j,t} \overset{i.i.d}{\sim} N(0_{l_{i,j} \times 1}, I_{l_{i,j}}), v^{\phi_w}_{j,t} \overset{i.i.d}{\sim} N(0, 1) \qquad (11)$$

and $h_{i,j,o} \sim N(m_o{}^h P_o{}^h)$.

For each of the sources i, the signal can be rewritten in the following form:

$$s_{i,t:t-\lambda_i+1} = A^S_{i,t} s_{i,t-1:t-\lambda_i} + B^s_{i,t} v^s_{i,t} \qquad (12)$$

where $\lambda_i \overset{\Delta}{=} \max\{pi, \max_j\{l_{i,j}\}\}$ and $A^s_{i,t}$ is a $\lambda_i \times \lambda_i$ matrix defined as:

$$A^s_{i,t} \overset{\Delta}{=} \begin{bmatrix} a^T_{i,t} 0_{1 \times (\lambda_i - p_i)} \\ I_{\lambda_i - 1} 0_{(\lambda_i - 1) \times 1} \end{bmatrix}, B^s_{i,t} \overset{\Delta}{=} (\sigma_{v,i,t}, 0_{1 \times (\lambda_i - 1)})^T \qquad (13)$$

The dynamic system equations can be rewritten as:

$$x_{t+1} = A^x_{t+1} x_t + B^x_{t+1} v^x_{t+1} \qquad (14)$$

$$y_t = C^x_t x_t + D^x_t w^x_t$$

with $$A^x_t \overset{\Delta}{=} diag(A_{1,t}, \ldots A_{m,t}), B^x_t \overset{x\Delta}{=} diag(B_{1,t}, \ldots, B_{m,t}) \qquad (15)$$

$$v^x_t = (v^s_{1,t} \ldots v^s_{m,t})^T, x^{\Delta}_t = (s^T_{1,t:t-\lambda_1+1} \ldots s^T_{m,t:t-\lambda_m+1})^T$$

$[C^x_t]$ contains the mixing system and $w^x_t = (w_{1,t} \ldots W_{n,t})^T$, $$D^x_t \overset{x\Delta}{=} diag(\sigma_{w,1} \ldots \sigma_{w,n}).$$

Defining the "stacked" parameter vectors $$[a_t] \sum_{k=1}^{i-1} p_k + j, 1 \overset{\Delta}{=} [a_{i,t}]_{j,1} \quad i = 1, \ldots, m; j = 1, \ldots, p_i; \qquad (16)$$

-continued $i = 1, \ldots, m;$ $$[h_t] \sum_{u=1}^{i-1} \sum_{v=1}^{j_i-1} l_{uv} + k, 1 \overset{\Delta}{=} [h_{i,j,t}]_{k,1} \quad i = 1, \ldots, m; j_i = 1, \ldots, n;$$

$$k = 1, \ldots, l_{ij} \text{ and } l_a \overset{\Delta}{=} \sum_{i=1}^{m} p_i, l_h^{\Delta} \sum_{j=1}^{n} \sum_{i=1}^{m} l_{ij} = \sum_{j=1}^{n} l_{h,j}$$

it is possible to consider the following state space representations.

$$h_{t+1} = A^h_{t+1} h_t + B^h_{t+1} v^h_{t+1} \qquad (17)$$

$$y_t = C^h_t h_t + D^h_t w^h_t$$

where $A^h_t, B^h_t, \in R^{l_h \times l_h}, C^h \in R^{n \times m l_h}, D^h_t \in R^{n \times m}$ $$C^h_t \overset{\Delta}{=} diag\{x_{1:t-1_1,t+1} \ldots x_{m,t:t-1_{m,i}+1}\}_{i=1,\ldots n} \qquad (18)$$

and $$a_{t+1} = A^a_{t+1} a_t + B^a_{t+1} v^a_{t+1} \qquad (19)$$

$$x_t = C^a_t a_t + D^a_t w^a_t$$

with $A_t{}^a, B_t{}^a \in R^{1_a \times 1_a}, C_t{}^a \in R^{m \times l_a}$ where $$C_t{}^a = diag\{x_{i,t-1:t-P_i}\}_{i=1,\ldots,n} \qquad (20)$$

This is a practical interest as it allows the mixing filters and autoregressive filters to be integrated out because, conditional upon the variances and states $x_t$, the systems (17) and (19) are linear Gaussian state space models. Together with (14) they define a bilinear Gaussian process.

Given the number of sources m, $p_i$ and $l_{ij}$ it is required to estimate sequentially the sources $(x_t)_{t=1}, \ldots$ and their parameters $$\theta_t \overset{\Delta}{=} \{a_t, h_t, \sigma^2_{t;1:m,v}, \sigma^2_{t;1:n,w}\}$$

from the observations $y_{j,t}$. More precisely, in the framework of Bayesian estimation, one is interested in the recursive, in time, estimation of posterior distributions of the type $p(d\theta_t, dx_t | y_{1:t+L})$: when L=0 this corresponds to the filtering distribution and when L>0 this corresponds to the fixed-lag smoothing distribution. This is a very complex problem that does not admit any analytical solution, and it is necessary to resort to numerical methods. Such a numerical method is based on Monte Carlo simulation. Subsequently the following notation will be used:

$$\alpha_t \overset{\Delta}{=} \{a_t, h_t\}, \beta_t \overset{\Delta}{=} \{\sigma^2_{t;1:m,v}, \sigma^2_{t;1:n,w}\} \text{ and } \gamma_t \overset{\Delta}{=} \{x_t, \sigma^2_{t;1:m,v}, \sigma^2_{t;1:n,w}\}.$$

A simulation-based optimal filter/fixed-lag smoother is used to obtain filtered/fixed-lag smoothed estimates of the unobserved sources and their parameters of the type $$I_L(f_t) \triangleq \int f_t(\theta_t, x_t) p(d\theta_t, dx_t | y_{1:t+L}) \quad (21)$$

The standard Bayesian importance sampling method is first described, and then it is shown how it is possible to take advantage of the analytical structure of the model by integrating onto the parameters $a_t$ and $h_t$ which can be high dimensional, using Kalman filter related algorithms. This leads to an elegant and efficient algorithm for which the only tracked parameters are the sources and the noise variances. Then a sequential version of Bayesian importance sampling for optimal filtering is presented, and it is shown why it is necessary to introduce selection as well as diversity in the process. Finally, a Monte Carlo filter/fixed-lag smoother is described.

For any $f_t$ it will subsequently be assumed that $|I_L(f_t)| < +\infty$. Suppose that it is possible to sample N i.i.d. samples, called particles, $$(x_{0:t+L}^{(i)}, \theta_{0:t+L}^{(i)})$$

according to $p(x_{0:t+L}, \theta_{0:t+L} | y_{1:t+L})$. Then an empirical estimate of this distribution is given by $$\hat{p}_N(dx_{0:t+L}, d\theta_{0:t+L} | y_{1:t+L}) \frac{1}{N} \sum_{i=1}^{N} \delta_{x_{0:t+L}^{(i)}, \theta_{0:t+L}^{(i)}}(dx_{0:t+L}, d\theta_{0:t+L}) \quad (22)$$

so that a Monte Carlo approximation of the marginal distribution $p(dx_t, d\theta_t | y_{1:t+L})$ follows as $$\hat{p}_N(dx_t, d\theta_t | y_{1:t+L}) = \frac{1}{N} \sum_{i=1}^{N} \delta_{x_t^{(i)}, \theta_t^{(i)}}(dx_t, d\theta_t) \quad (23)$$

Using this distribution, an estimate of $I_L(f_t)$ for any $f_t$ may be obtained as $$\hat{I}_{L,N}(f_t) = \int f_t(x_t, \theta_t) \hat{p}_N(dx_t, d\theta_t | y_{1:t+L}) \quad (24)$$
$$= \frac{1}{N} \sum_{i=1}^{N} f_t(x_t^{(i)}, \theta_t^{(i)}).$$

This estimate is unbiased and from the strong law of large numbers, $$\hat{I}_{L,N}(f_t) \xrightarrow[N \to +\infty]{a.s.} I_L(f_t).$$

Under additional assumptions, the estimates satisfy a central limit theorem. The advantage of the Monte Carlo method is clear. It is easy to estimate $I_L(f_t)$ for any $f_t$, and the rate of convergence of this estimate does not depend on t or the dimension of the state space, but only on the number of particles N and the characteristics of the function $f_t$. Unfortunately, it is not possible to sample directly from the distribution $p(dx_{0:t+L}, d\theta_{0:t+L} | y_{1:t+L})$ at any t, and alternative strategies need to be investigated.

One solution to estimate $p(dx_{0:t+L}, d\theta_{0:t+L} | y_{1:t+L})$ and $I_L(f_t)$ is the well-known Bayesian importance sampling method as disclosed in A. Doucet, S. J. Godsill and C. Andrieu, "On sequential Monte Carlo sampling methods for Bayesian filtering", Statistics and Computing, 2000, the contents of which are incorporated herein by reference. This method assumes the existence of an arbitrary importance distribution $\pi(dx_{0:t+L}, d\theta_{0:t+L} | y_{0:t+L})$ which is easily simulated from, and whose support contains that of $p(dx_{0:t+L}, d\theta_{0:t+L} | y_{1:t+L})$. Using this distribution $I_L(f_t)$ may be expressed as $$I_L(f_t) = \frac{\int \pi(dx_{1:t+L}, d\theta_{1:t+L} | y_{1:t+L}) f_t(x_t, \theta_t) w(x_{0:t+L}, \theta_{0:t+L})}{\int \pi(dx_{1:t+L}, d\theta_{1:t+L} | y_{1:t+L}) w(x_{0:t+L}, \theta_{0:t+L})}, \quad (25)$$

where the importance weight $w(x_{0:t+L}, \theta_{0:t+L})$ is given by $$w(x_{0:t+L}, \theta_{0:t+L}) \propto \frac{p(x_{0:t+L}, \theta_{0:t+L} | y_{1:t+L})}{\pi(x_{0:t+L}, \theta_{0:t+L} | y_{1:t+L})} \quad (26)$$

The importance weight can normally only be evaluated up to a constant of proportionality, since, following from Bayes' rule $$p(dx_{0:t+L}, d\theta_{0:t+L} | y_{1:t+L}) = \frac{p(y_{1:t+L} | x_{0:t+L}, \theta_{0:t+L}) p(dx_{0:t+L}, d\theta_{0:t+L})}{p(y_{1:t+L})}, \quad (27)$$

where the normalizing constant $p(y_{1:t+L})$ can typically not be expressed in closed-form.

If N i.i.d. samples $$(x_{0:t+L}^{(i)}, \theta_{0:t+L}^{(i)})$$

can be simulated according to a distribution $\pi(dx_{0:t+L}, d\theta_{0:t+L} | y_{1:t+L})$, a Monte Carlo estimate of $I_L(f_t)$ in (25) may be obtained as $$\hat{I}_{L,N}^1(f_t) = \frac{\sum_{i=1}^{N} f_t(x_t^{(i)}, \theta_t^{(i)}) w(x_{0:t+L}^{(i)}, \theta_{0:t+L}^{(i)})}{\sum_{i=1}^{N} w(x_{0:t+L}^{(i)}, \theta_{0:t+L}^{(i)})} \quad (28)$$
$$= \sum_{i=1}^{N} \tilde{w}_{0:t+L}^{(i)} f_t(x_t^{(i)}, \theta_t^{(i)}),$$

where the normalized importance weights are given by $$\bar{w}_{0:t+L}^{(i)} = \frac{w(x_{0:t+L}^{(i)}, \theta_{0:t+L}^{(i)})}{\sum_{j=1}^{N} w(x_{0:t+L}^{(j)}, \theta_{0:t+L}^{(j)})}. \quad (29)$$

This method is equivalent to a point mass approximation of the target distribution of the form $$\hat{p}_N(dx_{0:t+L}, d\theta_{0:t+L}|y_{1:t+L}) = \sum_{i=1}^{N} \bar{w}_{0:t+L}^{(i)} \delta_{x_{0:t+L}^{(i)}, \theta_{0:t+L}^{(i)}}(dx_{0:t+L}, d\theta_{0:t+L}), \quad (30)$$

The perfect simulation case, when $\pi(dx_{0:t+L}, d\theta_{0:t+L}|y_{1:t+L}) = p(dx_{0:t+L}, d\theta_{0:t+L}|y_{1:t+L})$, corresponds to $$\bar{w}_{0:t+L}^{(i)} = N^{-1},$$

i=1, . . . ,N. In practice, the importance distribution will be chosen to be as close as possible to the target distribution in a given sense. For finite N, $$\hat{I}_{L,N}^1(f_t)$$

is biased, since it involves a ratio of estimates, but asymptotically; according to the strong law of large numbers, $$\hat{I}_{L,N}^1(f t) \xrightarrow[N \to +\infty]{a.s.} I_L(f_t).$$

Under additional assumptions a central limit theorem also holds as disclosed in Doucet, Godsill and Andrieu.

It is possible to reduce the estimation of $p(dx_t, d\theta_t|y_{1:t+L})$ and $I_L(f_t)$ to one of sampling from $p(d\gamma_{0:t+L}|y_{1:t+L})$, where we recall that $$\gamma_t \triangleq \{x_t, \sigma_{t,1:m,v}^2, \sigma_{t,1:n,w}^2\}.$$

Indeed, $$p(d\alpha_t, d\gamma_{0:t+L}|y_{1:t+L}) = p(d\alpha_t|\gamma_{0:t+L}, y_{1:t+L}) \times p(d\gamma_{0:t+L}|y_{1:t+L}) \quad (31)$$

where $p(d\alpha_t|\gamma_{0:t+L}, y_{1:t+L})$ is a Gaussian distribution whose parameters may be computed using Kalman filter type techniques. Thus, given an approximation of $p(d\gamma_{0:t+L}|y_{1:t+L})$, an approximation of $p(dx_t, d\theta_t|y_{1:t+L})$ may straightforwardly be obtained. Defining the marginal importance distribution and associated importance weight as $$\pi(d\gamma_{0:t+L}|y_{1:t+L}) = \quad (32)$$

$$\int \pi(d\alpha_{0:t+L} d\gamma_{0:t+L}|y_{1:t+L}) w(\gamma_{0:t+L}) \propto \frac{p(\gamma_{0:t+L}|y_{1:t+L})}{\pi(\gamma_{0:t+L}|y_{1:t+L})},$$

and assuming that a set of samples $$\gamma_{0:t+L}^{(i)}$$

distributed according to $\pi(d\gamma_{0:t+L}|y_{1:t+L})$ is available, an alternative Bayesian importance sampling estimate of $I_L(f_t)$ follows as $$\hat{I}_N^2(ft) = \frac{\sum_{i=1}^{N} p(\alpha_t^{(i)}|\gamma_{0:t+L}^{(i)}, y_{1:t+L}) f_t(x_t^{(i)}, \theta_t^{(i)}) w(\gamma_{0:t+L}^{(i)})}{\sum_{i=1}^{N} w(\gamma_{0:t+L}^{(i)})} = \quad (33)$$

$$\sum_{i=1}^{N} \tilde{w}_{0:t+L}^{(i)} p(\alpha_t^{(i)}|\gamma_{0:t+L}^{(i)}, y_{1:t+L}) f_t(x_t^{(i)}, \theta_t^{(i)}),$$

provided that $p(\alpha_t|\gamma_{0:t+L}, y_{1:t+L}) f_t(x_t, \theta_t)$ can be evaluated in a closed form expression. In (33) the marginal normalized importance weights are given by $$\tilde{w}_{0:t+L}^{(i)} = \frac{w(\gamma_{0:t+L}^{(i)})}{\sum_{j=1}^{N} w(\gamma_{0:t+L}^{(j)})}, i = 1, \ldots, N. \quad (34)$$

Intuitively, to reach a given precision, $$\hat{I}_{L,N}^2(f_t)$$

will need a reduced number of samples over $$\hat{I}_{L,N}^2(f_t),$$

since it only requires samples from the marginal distribution $$\pi(d\gamma_{0:t+L}^{(i)}|y_{1:t+L}).$$

It can be proved that the variances of the estimates is subsequently reduced as disclosed in A. Doucet, J. F. G. de Freitas and N. J. Gordon (eds.), Sequential Monte Carlo Methods in Practice, Springer-Verlag, June 2000, the contents of which are incorporated herein by reference. In the present case, this is important as at each time instant the number of parameters is (when assuming that all mixing filters and AR processes have the same length), $m^2L$–$mL$ parameters for the mixing filters, where L can be large.

m or 1 parameter(s) for the observation noise.

nl+n parameters for the autoregressive processes.

n parameters for the sources.

It is not clear which integration will allow for the best variance reduction, but, at least in terms of search in the parameters space, the integration of the mixing filters and autoregressive filters seems preferable.

Given these results, the subsequent discussion will focus on Bayesian importance sampling methods to obtain approximations of $$p(d\gamma_{0:t+L}^{(i)} | y_{1:t+L})$$

and $I_L(f_t)$ using an importance distribution of the form $$\pi(d\gamma_{0:t+L}^{(i)} | y_{1:t+L}).$$

The methods described up to now are batch methods. How a sequential method may be obtained is described below.

The importance distribution at discrete time t may be factorized as $$\pi(d\gamma_{0:t+L} | y_{1:t+L}) = \pi(d\gamma_0 | y_{1:t+L}) \prod_{k=1}^{t+L} \pi(d\gamma_k | \gamma_{0:k-1}, y_{1:t+L}). \quad (35)$$

The aim is to obtain at any time t an estimate of the distribution $p(d\gamma_{0:t+L}|y_{1:t+L})$ and to be able to propagate this estimate in time without modifying subsequently the past simulated trajectories $$\gamma_{0:t+L}.$$

This means that $\pi(d\gamma_{0:t+L}|y_{1:t+L})$ should admit $\pi(d\gamma_{0:t-1+L}|y_{1:t+L})$ as marginal distribution. This is possible if the importance distribution is restricted to be of the general form $$\pi(d\gamma_{0:t+L} | y_{1:t+L}) = \pi(d\gamma_0) \prod_{k=1}^{t+L} \pi(d\gamma_k | \gamma_{0:k-1}, y_{1:k}), \quad (36)$$

Such an importance distribution allows recursive evaluation of the importance weights, i.e. $w(\gamma_{0:t+L}) = W(\gamma_{0:t-1+L}) W_{t+L}$, and in this particular case $$\frac{p(\gamma_{0:t+L} | y_{1:t+L})}{\pi(\gamma_{0:t+L} | y_{1:t+L})} \alpha \frac{p(\gamma_{0:t+L-1} | y_{1:t+L-1})}{\pi(\gamma_{0:t+L-1} | y_{1:t+L-1})} \times \quad (37)$$

$$\frac{p(y_{t+L} | \gamma_{0:t+L}) p(x_{t+L} | x_{t+L-1}, \beta_{t+L}) p(\beta_{t+L} | \beta_{t+L-1})}{\pi(\gamma_{t+L} | \gamma_{0:t+L-1}, y_{1:t+L})}$$

The quantity $p(dx_{t+L}|x_{t+L}, \beta_{t+L})$ can be computed up to a normalizing constant using a one step ahead Kalman filter for the system given by Eq. (19) and $p(y_{t+L}|x_{0:t+L}, \beta_{t+L})$ can be computed using a one step ahead Kalman filter of the system given by Eq. (17).

There is an unlimited number of choices for the importance distribution $\pi(d\gamma_{0:t+L}|y_{1:t+L})$, the only restriction being that its support includes that of $p(d\gamma_{0:t+L}|y_{1:t+L})$. Two possibilities are considered next. A possible strategy is to be choose at time t+L the importance distribution that minimizes the variance of the importance weights given $\gamma_{0:t-1}$ and $y_{1:t}$. The importance distribution that satisfies this condition is $p(d\gamma_{t+L}|\gamma_{0:t-1+L}, y_{1:t+L})$, with the associated incremental importance weight given by $$w_{t+L} \alpha p(y_{t+L} | \gamma_{0:t-1+L}, y_{1:t+L-1}) = \quad (38)$$

$$\int p(y_{t+L} | \gamma_{0:t+L}, y_{1:t+L-1}) p(d\gamma_{t+L} | \gamma_{t-1+L}).$$

Direct sampling from the optimal importance distribution is difficult, and evaluating the importance weight is analytically intractable. The aim is thus in general to mimic the optimal distribution by means of tractable approximations, typically local linearization $p(d\gamma_t|\gamma_{0:t-1}, y_{1:t})$. Instead, a mixed suboptimal method is described. We propose to sample the particles at time t according to two importance distributions $\pi_1$, and $\pi_2$ with proportions $\alpha$ and $1-\alpha$ such that the importance weights $$w(\gamma_{0:t+L}^{(i)})$$

have now the form (note that it would be possible to draw $N_1$ and $N_2$ randomly according to a Bernoulli distribution with parameter $\alpha$, but this would increase the estimator variance)

$$\begin{cases} \alpha \frac{p(\gamma_{0:t+L}^{(i)} | y_{1:t+L})}{\pi_1(\gamma_{0:t+L}^{(i)} | y_{1:t+L})} \Big/ E_{\pi_1}\Big[\frac{p(\gamma_{0:t+L} | y_{1:t+L})}{\pi_1(\gamma_{0:t+L} | y_{1:t+L})}\Big] \\ (1-\alpha) \frac{p(\gamma_{0:t+L}^{(i)} | y_{1:t+L})}{\pi_2(\gamma_{0:t+L}^{(i)} | y_{1:t+L})} \Big/ E_{\pi_2}\Big[\frac{p(\gamma_{0:t+L} | y_{1:t+L})}{\pi_2(\gamma_{0:t+L} | y_{1:t+L})}\Big] \end{cases} \quad (39)$$

which in practice is estimated as $$\tilde{w}_{0:t+L}^{(i)} \begin{cases} \alpha \frac{p(\gamma_{0:t+L}^{(i)} | y_{1:t+L}) / \pi_1(\gamma_{0:t+L}^{(i)} | y_{1:t+L})}{\sum_{j=1}^{N\alpha} p(\gamma_{0:t+L}^{(j)} | y_{1:t+L}) / \pi_1(\gamma_{0:t+L}^{(j)} | y_{1:t+L})} \\ (1-\alpha) \frac{p(\gamma_{0:t+L}^{(i)} | y_{1:t+L}) / \pi_2(\gamma_{0:t+L}^{(i)} | y_{1:t+L})}{\sum_{j=\alpha N+1}^{N\alpha} p(\gamma_{0:t+L}^{(j)} | y_{1:t+L}) / \pi_2(\gamma_{0:t+L}^{(j)} | y_{1:t+L})} \end{cases} \quad (40)$$

The importance distribution $\pi_1(dx_{t+L}|x_{1:t+L-1}, \beta_{1:t+L}, y_{1:t+L})$ will be taken to a distribution centered around zero with variance $\sigma_x^2$, and $\pi_2(dX_{t+L}|x_{1:t+L-1}, \beta_{1:t+L}, y_{1:t+L})$ is taken to be $$p(dx_{t+L}^{(i)} | m_{t+L|t+L}^{a,h(i)}, p_{t+L|t+L}^{a,h(i)}, \beta_{t+L}^{(i)}, y_{1:t+L})$$

which is a Gaussian distribution obtained from a one step ahead Kalman filter for the state space model described in (14) with $$m_{t+L|t+L}^{a(i)} \text{ and } m_{t+L|t+L}^{h(i)}$$

as values for $a^{(i)}$ and $h^{(i)}$ and initial variances $P^a_{t+L|t+L}$ and $P^h_{t+L|t+L}$. The variances are sampled from their prior distributions, and expression (37) is used to compute $$\tilde{w}_{0:t+L}^{(i)}.$$

Note that other importance distributions are possible, but this approach yields good results and seems to preserve diversity of the samples.

For importance distributions of the form specified by (36) the variances of the importance weights can only increase (stochastically) over time, as disclosed by Doucet, Godsill and Andrieu and the references therein. It is thus impossible to avoid a degeneracy phenomenon. Practically, after a few iterations of the algorithm, all but one of the normalized importance weights are very close to zero, and a large computational effort is devoted to updating trajectories whose contribution to the final estimate is almost zero. For this reason it is of crucial importance to include selection and diversity. This is discussed in more detail hereinafter.

The purpose of a selection (or resampling) procedure is to discard particles with low normalized importance weights and multiply those with high normalized importance weights, so as to avoid the degeneracy of the algorithm. A selection procedure associates with each particle, say $$\tilde{\gamma}_{0:t}^{(i)},$$

a number of children $N_i \in \mathbb{N}$, such that $$\sum_{i=1}^{N} N_i = N,$$

to obtain N new particles $$\bar{\gamma}_{0:t}^{(i)}. \text{ If } N_i = 0 \text{ then } \tilde{\gamma}_{0:t}^{(i)}$$

is discarded, otherwise it has $N_i$ children at time t+1. After the selection step the normalized importance weights for all the particles are reset to $N^{-1}$, thus discarding all information regarding the past importance weights. Thus, the normalized importance weight prior to selection in the next time step is proportional to (37). These will be denoted as $$\tilde{w}_t^{(i)},$$

since they do not depend on any past values of the normalized importance weights. If the selection procedure is performed at each time step, then the approximating distribution before the selection step is given by $$\tilde{p}_N(d\gamma_{0:t} | y_{1:t}) = \sum_{i=1}^{N} \tilde{w}_t^{(i)} \delta_{\tilde{\gamma}_{0:t}^{(i)}}(d\gamma_{0:t}),$$

and the one after the selection step follows as $$\hat{p}_N(d\gamma_{0:t} | y_{1:t}) = N^{-1} \sum_{i=1}^{N} \tilde{w}_t^{(i)} \delta_{\bar{\gamma}_{0:t}^{(i)}}(d\gamma_{0:t}).$$

Systematic sampling as disclosed by Doucet, de Freitus and Gordon is chosen for its good variance properties.

However selection poses another problem. During the resampling stage, any particular particle with a high importance weight will be duplicated many times. In particular, when L>0, the trajectories are resampled L times from time t+1 to t+L so that very few distinct trajectories remain at time t+L. This is the classical problem of depletion of samples. As a result the cloud of particles may eventually collapse to a single particle. This degeneracy leads to poor approximation of the distributions of interest. Several suboptimal methods have been proposed to overcome this problem and introduce diversity amongst the particles. Most of these are based on kernel density methods (as disclosed by Doucet, Godsill and Andrieu and by N. J. Gordon, D. J. Salmond and A. F. M. Smith, "Novel approach to nonlinear/non-Gaussian Bayesian state estimation", IEE Proceedings-F, vol. 140, no. 2, pp. 107–113, 1993, (the contents of which are incorporated herein by reference), which approximate the probability distribution using a kernel density estimate based on the current set of particles, and sample a new set of distinct particles from it. However, the choice and configuration of a specific kernel are not always straightforward. Moreover, these methods introduce additional Monte Carlo variation. It is shown hereinafter how MCMC methods may be combined with sequential importance sampling to introduce diversity amongst the samples without increasing the Monte Carlo variation.

An efficient way of limiting sample depletion consists of simply adding an MCMC step to the simulation-based filter/fixed-lag smoother (see Berzuini and Gilks referred to by Doucet, Godsill and Andrieu and by C. P. Robert and G. Casella, Monte Carlo Statistical Methods, Springer Verlag, 1999, the contents of which are incorporated herein by reference). This introduces diversity amongst the samples and thus drastically reduces the problem of depletion of samples. Assume that, at time t+L, the particles $$\gamma_{0:t+L}^{'(i)}$$

are marginally distributed according to $p(d\gamma_{0:t+L}|y_{1:t+L})$. If a transition kernel K $(\gamma_{0:t+L}|d\gamma'_{0:t+L})$ with invariant distribution p $(d\gamma_{0:t+L}|y_{1:t+L})$ is applied to each of the particles, then the new particles $$\gamma_{0:t+L}^{(i)}$$

are still distributed according to the distribution of interest. Any of the standard MCMC methods, such as the Metropolis-Hastings (MH) algorithm or Gibbs sampler, may be used. However, contrary to classical MCMC methods, the transition kernel does not need to be ergodic. Not only does this method introduce no additional Monte Carlo variation, but it improves the estimates in the sense that it can only reduce the total variation norm of the current distribution of the particles with respect to the target distribution.

Given at time t+L−1, N∈N* particles $$\gamma_{0:t+L-1}^{(i)}$$

distributed approximately according to $p(d\gamma_{0:t+L-1}|y_{1:t+L-1})$, the Monte Carlo fixed-lag smoother proceeds as follows at time t+L.

Sequential Importance Sampling Step
For i=1, ..., N, $$\tilde{\gamma}_{t+L}^{(i)} \sim \pi(d\gamma_{t+L}|x_{0:t+L-1}^{(i)}, y_{1:t+L}) \text{ and set } \tilde{\gamma}_{0:t+L}^{(i)} = (\tilde{\gamma}_{0:t+L-1}^{(i)}, \tilde{\gamma}_{t+L}^{(i)}).$$

For i=1, ..., N, compute the normalized importance weights $$\tilde{w}_{t+L}^{(i)}$$

using (37) and (40).

Selection Step
Multiply/discard particles $$\tilde{\gamma}_{0:t+L}^{(i)}$$

with respect to high/low normalised importance weights to obtain N particles $$\gamma_{0:t+L}^{(i)},$$

e.g. using systematic sampling.

MCMC Step
For i=1, ..., N, apply to $$\gamma_{0:t+L}^{\prime(i)}$$

a Markov transition kernel $$K(\gamma_{0:t+L}^{(i)} | d\gamma_{0:t+L}^{\prime(i)})$$

with invarient distribution $p (d\gamma_{0:t+L}|y_{1:t+L})$ to obtain N particles $$\gamma_{0:t+L}^{(i)}.$$

There is an unlimited number of choices for the MCMC transition kernel. Here a one-at-a-time MH algorithm is adopted that updates at time t+L the values of the Markov process from time t to t+L. More specifically $$\gamma_k^{(i)},$$

k=t, ..., t+L, i=1, ..., N, is sampled according to $$p(d\gamma_k | \gamma_{-k}^{(i)}, y_{1:t+L}), \text{ with } \gamma_{-k}^{(i)} \triangleq (\gamma_{0:t-1}^{(i)}, \gamma_t^{(i)}, \ldots, \gamma_{k+1}^{\prime(i)}, \ldots, \gamma_{t+L}^{\prime(i)}).$$

It is straightforward to verify that this algorithm admits p $(d\gamma_{0:t+L}|y_{1:t+L})$ as invariant distribution. Sampling from $$p(d\gamma_k | \gamma_{-k}^{(i)}, y_{1:t+L})$$

can be done efficiently via a backward-forward algorithm of O (L+1) complexity as disclosed in A. Doucet and C. Andrieu, "Iterative algorithms for optimal state estimation of jump Markov linear systems", in Proc. Conf. IEEE ICASSP, 1999 the contents of which are incorporated herein by reference. At time t+L it proceeds as summarised below for the i-th particle.

For k=t+L, ..., t, compute and store $$P_{k|k+1}^{-1} m_{k|k+1}' \text{ and } P_{k|k+1}^{-1}$$

by running the information filter defined in (50)–(51) for the two systems (17) and (19).

Forward Step
For k=t, ..., t+L.
Sample a proposal $\gamma_k \sim q (d\gamma_k|\gamma_{-k}, y_{0:t+L})$, using the proposal distribution in (43).
Perform one step of the Kalman filter in (48)–(49) for the current value $$\gamma_k^{\prime(i)}$$

and the proposed value $\gamma_k$, and calculate their posterior probabilities using (41) and for the two systems (17) and (19).

Compute the MH acceptance probability $$\alpha(\gamma_k'^{(i)}, \gamma_k),$$

as defined in (44).

If $(u \sim U_{[0,1]}) \leq \alpha(\gamma_k'^{(i)}, \gamma_k)$, set $\gamma_k^{(i)} = \gamma_k$, otherwise set $\gamma_k^{(i)} = \gamma_k'^{(i)}$.

The target posterior distribution for each of the MH steps is given by $$p(x_k, \beta_k | x_{-k}, \beta_{-k}, y_{1:t+L}) \quad (41)$$
$$\alpha p(y_{1:t+L} | x_{0:t+L}, \beta_{0:t+L}) p(x_k, \beta_k | x_{-k}, \beta_{-k})$$
$$\alpha p(y_{1:t+L} | x_{0:t+L}, \beta_{0:t+L}) p(x_k | x_{-k}, \beta_{0:t+L}) p(\beta_k | x_{-k}, \beta_{-k})$$
$$\alpha p(y_{1:t+L} | x_{0:t+L}, \beta_{0:t+L}) p(x_k | x_{0:k-1},$$
$$\beta_{0:t+L}) p(x_{k+1:t+L} | x_{1:k}, \beta_{0:t+L}) p(\beta_k | \beta_{-k})$$
$$\alpha p(y_k | x_{0:k-1}, \beta_{0:k-1}) \times$$
$$\int p(y_{k+1:t+L} | h_k, x_{k+1:t+L}, \beta_{k+1:t+L}) p(h_k | y_{1:k}, x_{0:k}, \beta_{0:k}) dh_k \times$$
$$p(\beta_k | \beta_{k-1}) p(\beta_{k+1} | \beta_k) p(x_k | \beta_{0:t+L}) \int p(x_{k+1:t+L} | a_k,$$
$$\beta_{k+1:t+L}) p(a_k | x_{1:k}, \beta_{0:k}) d a_k$$

There is a similarity between the two expressions in $y_k$ and $x_k$. These two terms can be computed in an identical way by first using two Kalman filters for system (17) and (19) to obtain $p(y_k|x_{0:k-1}, \beta_{0:k-1}) = N(y_k; y_{k|k-1} S_k^h)$ and $p(x_k|\beta_{0:t+L}) = N(x_k; x_{k|k-1} S_k^a)$ and secondly two information filters to obtain $$\int p(y_{k+1:t+L} | h_k, x_{k+1:t+L}, \beta_{k+1:t+L}) p(h_k | y_{1:k}, x_{0:k}, \beta_{0:k}) dh_k$$
$$\alpha \left| I_{\tilde{n}_h} + \prod_k \tilde{R}_k^{hT} P_{k/k+1}^{h/-1} \tilde{R}_k^h \right|^{-1/2} \times$$
$$\exp\left(-\frac{1}{2}\left(m_{k/k}^{hT} P_{k/k}^{h/-1} m_{k/k}^h - 2 m_{k/k}^{hT} P_{k/k+1}^{h/-1} m_{k/k+1}^{h/} - \right.\right.$$
$$\left.\left. (m_{k|k+1}^{h/} - m_{k/k}^h)^T P_{k/k+1}^{h/-1} \tilde{Q}_k^h P_{k/k+1}^{h/-1} (m_{k/k+1}^{h/} - m_{k|k}^h) \right)\right),$$

and a similar expression for $\int p(x_{k+1:t+L}|\alpha_k, \beta_{k+1:t+L}) p(\alpha_k | x_{1:k}, \beta_{0:k}) d\alpha_k$. The different matrices involved are defined as follows. Let $$P_{k|k}^h = \tilde{R}_k^h \Pi_k^h \tilde{R}_k^{hT},$$

where $\tilde{\Pi}_k^h \in R^{\tilde{n}_h \times \tilde{n}_h}$ is the diagonal matrix containing the $\tilde{n}_h \leq n_h$ non-zero singular values of $P_{k|k}^h$ and $\tilde{R}_k^h \in R^{n_h \times \tilde{n}_h}$ is the matrix containing the columns of $R_k^h$ corresponding to the non-zero singular values, where $$P_{k|k}^h = R_k^h \Pi_k^h R_k^{hT}$$

is the singular value decomposition of $$P_{k|k}^h.$$

The matrix $\tilde{Q}_k^h$ is given by $$\tilde{Q}_k^h = \tilde{R}_k^h (\tilde{\Pi}_k^{h-1} + \tilde{R}_k^{hT} P_{k|k+1}^{h/-1} \tilde{R}_k^h)^{-1} \tilde{R}_k^{hT}.$$

To sample from the distribution in (41) using a MH step, the proposal distribution is here taken to be:

$$q(\beta_k | \beta_{k-1}, \beta_{k+1}) \alpha p(\beta_{k+1} | \beta_k) p(\beta_k | \beta_{k-1}) \quad (42)$$

$$q(x_k | x_{-k}, \beta_{0:t+L}, y_{0:t+L}) \alpha p(x_k | m_{k|k}^a, m_k^h, \beta_k, y_{0:k})$$

and $$q(\gamma_k|\gamma_{-k}, y_{0:t+L}) \alpha q(\beta_k|\beta_{k-1}, \beta_{k-1}) q(x_k|x_{-k}, \beta_{0:t+L}). \quad (43)$$

which requires a one step ahead Kalman filter on the system (14). In both cases $$\phi_k \mid (\phi_{k-1}, \phi_{k+1}) \sim N\left(\frac{\phi_{k-1} + \phi_{k+1}}{2}, \frac{\sigma^2}{2}\right).$$

If the current and proposed new values for the state of the Markov chain are given by $\gamma_k$ and $\gamma'_k$, respectively, the MH acceptance probability follows as $$\alpha(\gamma_k, \gamma'_k) = \min\{1, r(\gamma_k, \gamma'_k)\}, \quad (44)$$

with the acceptance ratio given by $$r(\gamma_k, \gamma'_k) = \frac{p(\gamma'_k|\gamma_{-k}, y_{1:t+L}) q(\gamma_k|\gamma_{-k}, y_{1:t+L})}{p(\gamma_k|\gamma_{-k}, y_{1:t+L}) q(\gamma'_k|\gamma_{-k}, y_{1:t+L})}. \quad (45)$$

At each iteration the computational complexity of the Monte Carlo fixed-lag smoother is $O((L+1)N)$, and it is necessary to keep in memory the paths of all the trajectories from time t to t+L, i.e.

$$\{\gamma_{t:t+L}^{(i)} : i = 1, \ldots, N\}$$

as well as the sufficient statistics $$m_{t|t}^{a,h(i)}, P_{t|t}^{a,h(i)} : i = 1, \ldots, N\}.$$

The computational complexity of this algorithm at each iteration is clearly O (N). At first glance, it could appear necessary to keep in memory the paths of all the trajectories $$\{\gamma_{0:t}^{(i)} : i = 1, \ldots, N\},$$

so that the storage requirements would increase linearly with time. In fact, for both the optimal and prior importance distributions, $\pi (\gamma_t|\gamma_{0:t-1}, y_{1:t})$ and the associated importance weights depend on $\gamma_{0:t-1}$ only via a set of low-dimensional sufficient statistics $$\{m_{t|t}^{a,h(i)}, P_{t|t}^{a,h(i)} : i = 1, \ldots, N\},$$

and only these values need to be kept in memory. Thus, the storage requirements are also O (N) and do not increase over time. Appendix: Kalman filter recursions The System $$x_{t+1} = A_{t+1} x_t + B_{t+1} v_{t+1} \tag{46}$$

$$y_t = C_t x_t + D_t w_t \tag{47}$$

is considered.

The sequence $\zeta_{1:T}$ being here assumed known, the Kalman filter equations are the following.

Set $m_{0|0} = \zeta_0$ and $P_{0|0} = P_0$, then for $t=1, \ldots, T$ compute $$m_{t|t-1} = A m_{t-1|t-1}$$

$$P_{t|t-1} = A_t P_{t-1|t-1} A_t^T + B_t B_t^T$$

$$y_{t|t-1} = C_t m_{t|t-1} C_t \tag{47}$$

$$S_t = C_t P_{t|t-1} C_t^T + D_t D_t^T \tag{48}$$

$$m_{t|t} = m_{t|t-1} + P_{t|t-1} C_t^T S_t^{-1} \tilde{y}_{t|t-1}$$

$$P_{t|t} = P_{t|t-1} - P_{t|t-1} C_t^T S_t^{-1} C_t P_{t|t-1}$$

where $m_{t|t-1} = E\{x_t|y_{1:t-1}, \zeta_{1:t}\}$, $m_{t|t} = E\{x_t|y_{1:t}, \zeta_{1:t}\}$, $\tilde{y}_{t|t-1} = y_t - y_{t|t-1}$, $P_{t|t-1} = \text{cov}\{x_t|y_{1:t-1}, \zeta_{1:t}\}$, $P_{t|t} = \text{cov}\{x_t|y_{1:t,\zeta_{1:t}}\}$, $y_{t|t-1} = E\{y_t|y_{1:t-1}, \zeta_{1:t}\}$ and $S_t = \text{cov}\{y_t|y_{1:t-1}, \zeta_{1:t}\}$. The likelihood $p(y_t|\zeta_{1:t})$ is estimated as $$p(y_t|\zeta_{1:t}) = \frac{1}{|2\pi P_{t|t-1}|^{1/2}} \exp\left(\frac{-1}{2\sigma_v^2} \tilde{y}_{t|t-1}^T \tilde{y}_{t|t-1}\right) \tag{49}$$

The backward information filter proceeds as follows from time $t+L$ to $t$.

$$P_{t+L|t+L}^{\prime-1} = C_{t+L}^T (D_{t+L} D_{t+L}^T)^{-1} C_{t+L} \tag{50}$$

$$P_{t+L|t+L}^{\prime-1} m_{t+L|t+L}^{\prime} = C_{t+L}^T (D_{t+L} D_{t+L}^T)^{-1} y_{t+L}$$

and for $k = t+L-1, \ldots, 1$ $$\Delta_{k+1} = [I_{n_v} + B_{k+1}^T P_{k+1|k+1}^{\prime-1} B_{k+1}]^{-1} \tag{51}$$

$$P_{k|k+1}^{\prime-1} = A_{k+1}^T P_{k+1|k+1}^{\prime-1} \times$$

$$(I_{n_x} - B_{k+1} \Delta_{k+1} B_{k+1}^T P_{k+1|k+1}^{\prime-1}) A_{k+1}$$

$$P_{k|k+1}^{\prime-1} m_{k|k+1}^{\prime} = A_{k+1}^T (I_{n_x} - B_{k+1} \Delta_{k+1} B_{k+1}^T P_{k+1|k+1}^{\prime-1}) \times$$

$$P_{k+1|k+1}^{\prime-1} m_{k+1|k+1}^{\prime}$$

$$P_{k|k}^{\prime-1} = P_{k|k+1}^{\prime-1} + C_k^T (D_k D_k^T)^{-1} C_k$$

$$P_{k|k}^{\prime-1} m_{k|k}^{\prime} = P_{k|k+1}^{\prime-1} m_{k|k+1}^{\prime} + C_K^T (D_k D_k^T)^{-1} y_k$$

The invention claimed is:

1. A method of extracting at least one desired signal from a system comprising at least one measured contaminated signal and at least one communication channel via which the at least one contaminated signal is measured, comprising modelling the at least one desired signal as a first dynamical state space system with at least one first time-varying parameter and modelling the at least one communication channel as a second state space system having at least one second parameter, which is fixed and unknown.

2. A method as claimed in claim 1, in which the at least one desired signal is generated by a physical process.

3. A method as claimed in claim 2, in which the at least one first parameter models the physical generation process.

4. A method as claimed in claim 1, in which the at least one desired signal comprises a plurality of desired signals, each of which is modelled as a respective state space system.

5. A method as claimed in claim 4, in which at least one but not all of the plurality of desired signals is modelled with at least one third parameter, which is fixed and unknown.

6. A method as claimed in claim 4, in which at least one but not all of the plurality of desired signals is modelled with at least one third parameter, which is known.

7. A method as claimed in claim 4, in which the at least one communication channel comprises a plurality of communication channels and the at least one contaminated signal comprises a plurality of contaminated signals.

8. A method as claimed in claim 7, in which the number of communication channels is greater than or equal to the number of desired signals.

9. A method as claimed in claim 4, in which the at least one contaminated signal comprises a linear combination of time-delayed versions of at least some of the desired signals.

10. A method as claimed in claim 1, in which the at least one contaminated signal comprises the at least one desired signal contaminated with noise.

11. A method as claimed in claim 1, in which the at least one channel comprises a plurality of signal propagation paths of different lengths.

12. A method as claimed in claim 1, in which the at least one desired signal comprises an analog signal.

13. A method as claimed in claim 12, in which the analog signal is a temporally sampled analog signal.

14. A method as claimed in claim 12, in which the at least one desired signal comprises a sound signal.

15. A method as claimed in claim 14, in which the least one sound signal comprises speech.

16. A method as claimed in claim 14, in which the contaminated signals are measured by spatially sampling a sound field.

17. A method as claimed in claim 14, in which the at least one first parameter comprises a noise generation modelling parameter.

18. A method as claimed in claim 14, in which the at least one first parameter comprises a formant modelling parameter.

19. A method as claimed in claim 1, in which the at least one desired signal is modelled as a time-varying autoregression.

20. A method as claimed in claim 1, in which the at least one desired signal is modelled as a moving average model.

21. A method as claimed in claim 1, in which the at least one desired signal is modelled as a non-linear time-varying model.

22. A method as claimed in claim 1, in which the at least one communication channel is modelled as a finite impulse response model.

23. A method as claimed in claim 1, in which the at least one communication channel is modelled as an infinite impulse response model.

24. A method as claimed in claim 1, in which the at least one communication channel is modelled as a non-linear time-varying model.

25. A method as claimed in claim 1, in which the first state space system has at least one parameter which is modelled using a probability model.

26. A method as claimed in claim 25, in which the at least one desired signal is extracted by a Bayesian inversion.

27. A method as claimed in claim 26, in which the signal extraction is performed by one of a sequential Monte Carlo method an a particle filter.

28. A method as claimed in claim 26, in which the signal extraction is performed by one of a Kalman filter and an extended Kalman filter.

29. A method as claimed in claim 25, in which the at least one desired signal is extracted by maximum likelihood.

30. A method as claimed in claim 25, in which the at least one desired signal is extracted by a least squares fit.

31. A program for controlling a computer to perform a method as claimed in claim 1.

32. A carrier containing a program as claimed in claim 31.

33. A computer programmed by a program as claimed in claim 31.

34. A method of extracting at least one desired signal from a system comprising at least one measured contaminated signal and at least one communication channel via which the at least one contaminated signal is measured, comprising modelling the at least one desired signal as a first dynamical state space system with at least one first time-varying parameter and modelling the at least one communication channel as a second state space system having at least one second parameter which is time-varying, the at least one first time-varying parameter having a rate of change which is different from that of the at least one second time-varying parameter.

35. A method as claimed in claim 34, in which the at least one desired signal is generated by a physical process.

36. A method as claimed in claim 35, in which the at least one first parameter models the physical generation process.

37. A method as claimed in claim 34, in which the rate of change of the at least one first time-varying parameter is, on average, greater than that of the at least one second time-varying parameter.

38. A method as claimed in claim 34, in which the at least one desired signal comprises a plurality of desired signals, each of which is modelled as a respective state space system.

39. A method as claimed in claim 38, in which at least one but not all of the plurality of desired signals is modelled with at least one third parameter, which is fixed and unknown.

40. A method as claimed in claim 38, in which at least one but not all of the plurality of desired signals is modelled with at least one third parameter, which is known.

41. A method as claimed in claim 38, in which the at least one communication channel comprises a plurality of communication channels and the at least one contaminated signal comprises a plurality of contaminated signals.

42. A method as claimed in claim 41, in which the number of communication channels is greater than or equal to the number of desired signals.

43. A method as claimed in claim 38, in which the at least one contaminated signal comprises a linear combination of time-delayed versions of at least some of the desired signals.

44. A method as claimed in claim 34, in which the second parameter is known.

45. A method as claimed in claim 34, in which the at least one contaminated signal comprises the at least one desired signal contaminated with noise.

46. A method as claimed in claim 34, in which the at least one channel comprises a plurality of signal propagation paths of different lengths.

47. A method as claimed in claim 34, in which the at least one desired signal comprises an analog signal.

48. A method as claimed in claim 47, in which the analog signal is a temporally sampled analog signal.

49. A method as claimed in claim 47, in which the at least one desired signal comprises a sound signal.

50. A method as claimed in claim 49, in which the least one sound signal comprises speech.

51. A method as claimed in claim 49, in which the contaminated signals are measured by spatially sampling a sound field.

52. A method as claimed in claim 49, in which the at least one first parameter comprises a noise generation modelling parameter.

53. A method as claimed in claim 49, in which the at least one first parameter comprises a formant modelling parameter.

54. A method as claimed in claim 34, in which the at least one desired signal is modelled as a time-varying autoregression.

55. A method as claimed in claim 34, in which the at least one desired signal is modelled as a moving average model.

56. A method as claimed in claim 34, in which the at least one desired signal is modelled as a non-linear time-varying model.

57. A method as claimed in claim 34, in which the at least one communication channel is modelled as a finite impulse response model.

58. A method as claimed in claim 34, in which the at least one communication channel is modelled as an infinite impulse response model.

59. A method as claimed in claim 34, in which the at least one communication channel is modelled as a non-linear time-varying model.

60. A method as claimed in claim 34, in which the first state space system has at least one parameter which is modelled using a probability model.

61. A method as claimed in claim 60, in which the at least one desired signal is extracted by a Bayesian inversion.

62. A method as claimed in claim 61, in which the signal extraction is performed by one of a sequential Monte Carlo method and a particle filter.

63. A method as claimed in claim 61, in which the signal extraction is performed by one of a Kalman filter and an extended Kalman filter.

64. A method as claimed in claim 60, in which the at least one desired signal is extracted by maximum likelihood.

65. A method as claimed in claim 60, in which the at least one desired signal is extracted by a last squares fit.

66. A program for controlling a computer to perform a method as claimed in claim 34.

67. A camer containing a program as claimed in claim 66.

68. A computer programmed by a program as claimed in claim 66.

69. A method of extracting a plurality of desired signals from a system comprising at least one measured contaminated signal and at least one communication channel via which the at least one contaminated signal is measured, comprising modelling of each of the desired signals as a first dynamical state space system with at least one first time-varying parameter and modelling the at least one communication channel as a second state space system having at least one second parameter, at least one but not all of the plurality of desired signals being modelled with at least one third parameter, which is fixed and unknown.

70. A method as claimed in claim 69, in which at least one of the desired signals is generated by a physical process.

71. A method as claimed in claim 70, in which the at least one first parameter models the physical generation process.

72. A method as claimed in claim 69, in which the second parameter is known.

73. A method as claimed in claim 69, in which the at least one communication channel comprises a plurality of communication channels and the at least one contaminated signal comprises a plurality of contaminated signals.

74. A method as claimed in claim 73, in which the number of communications channel is greater that or equal to the number of desired signals.

75. A method as claimed in claim 69, in which the at least one contaminated signal comprises a linear combination of time-delayed versions of at least some of the desired signals.

76. A method as claimed in claim 69, in which the at least one contaminated signal comprises at least one of the desired signals contaminated with noise.

77. A method as claimed in claim 69, in which the at least one channel comprises a plurality of signal propagation paths of different lengths.

78. A method as claimed in claim 69, in which at least one of the desired signals comprises an analog signal.

79. A method as claimed in claim 78, in which the analog signal is a temporally sampled analog signal.

80. A method as claimed in claim 78, in which at least one of the desired signals comprises a sound signal.

81. A method as claimed in claim 80, in which the least one sound signal comprises speech.

82. A method as claimed in claim 80, in which the contaminated signals are measured by spatially sampling a sound field.

83. A method as claimed in claim 80, in which the at least one first parameter comprises a noise generation modelling parameter.

84. A method as claimed in claim 80, in which the at least one first parameter comprises a formant modelling parameter.

85. A method as claimed in claim 69, in which at least one of the desired signals is modelled as a time-varying autoregression.

86. A method as claimed in claim 69, in which at least one of the desired signals is modelled as a moving average model.

87. A method as claimed in claim 69, in which at least one of the desired signals is modelled as a non-linear time-varying model.

88. A method as claimed in claim 69, in which the at least one communication channel is modelled as a finite impulse response model.

89. A method as claimed in claim 69, in which the at least one communication channel is modelled as an infinite impulse response model.

90. A method as claimed in claim 69, in which the at least one communication channel is modelled as a non-linear time-varying model.

91. A method as claimed in claim 69, in which the first state space system has at least one parameter which is modelled using a probability model.

92. A method as claimed in claim 91, in which at least one of the desired signals is extracted by a Bayesian inversion.

93. A method as claimed in claim 92, in which the signal extraction is performed by one of a sequential Monte Carlo method and a particle filter.

94. A method as claimed in claim 92, in which the signal extraction is performed by one of a Kalman filter and an extended Kalman filter.

95. A method as claimed in claim 91, in which at least one of the desired signals is extracted by maximum likelihood.

96. A method as claimed in claim 91, in which at least one of the desired signals is extracted by a last squares fit.

97. A program for controlling a computer to perform a method as claimed in claim 69.

98. A carrier containing a program as claimed in claim 97.

99. A computer programmed by a program as claimed in claim 97.

100. A method of extracting a plurality of desired signals from a system comprising at least one measured contaminated signal and at least one communication channel via which the at least one contaminated signal is measured, comprising modelling each of the desired signals as a first dynamical state space system with at least one first time-varying parameter and modelling the at least one communication channel as a second state space system having at least one second parameter, at least one but not all of the plurality of desired signals being modelled with at least one third parameter, which is known.

101. A method as claimed in claim 100, in which at least one of the desired signals is generated by a physical process.

102. A method as claimed in claim 101, in which the at least one first parameter models the physical generation process.

103. A method as claimed in claim 100, in which the second parameter is known.

104. A method as claimed in claim 100, in which the at least one communication channel comprises a plurality of communication channels and the at least one contaminated signal comprises a plurality of contaminated signals.

105. A method as claimed in claim 104, in which the number of communication channels is greater than or equal to the number of desired signals.

106. A method as claimed in claim 100, in which the at least one contaminated signal comprises a linear combination of time-delayed versions of at least some of the desired signals.

107. A method as claimed in claim 100, in which the at least one contaminated signal comprises at least one of the desired signals contaminated with noise.

108. A method as claimed in claim 100, in which the at least one channel comprises a plurality of signal propagation paths of different lengths.

109. A method as claimed in claim 100, in which at least one of the desired signals comprises an analog signal.

110. A method as claimed in claim 109, in which the analog signal is a temporally sampled analog signal.

111. A method as claimed in claim 109, in which at least one of the desired signals comprises a sound signal.

112. A method as claimed in claim 111, in which the least one sound signal comprises speech.

113. A method as claimed in claim 111, in which the contaminated signals are measured by spatially sampling a sound field.

114. A method as claimed in claim 111, in which the at least one first parameter comprises a noise generation modelling parameter.

115. A method as claimed in claim 111, in which the at least one first parameter comprises a formant modelling parameter.

116. A method as claimed in claim 100, in which at least one of the desired signals is modelled as a time-varying autoregression.

117. A method as claimed in claim 100, in which at least one of the desired signals is modelled as a moving average model.

118. A method as claimed in claim 100, in which at least one of the desired signals is modelled as a non-linear time-varying model.

119. A method as claimed in claim 100, in which the at least one communication channel is modelled as a finite impulse response model.

120. A method as claimed in claim 100, in which the at least one communication channel is modelled as an infinite impulse response model.

121. A method as claimed in claim 100, in which the at least one communication channel is modelled as a non-linear time-varying model.

122. A method as claimed in claim 100, in which the first state space system has at least one parameter which is modelled using a probability model.

123. A method as claimed in claim 122, in which at least one of the desired signals is extracted by a Bayesian invention.

124. A method as claimed in claim 123, in which the signal extraction is performed by one of a sequential Monte Carlo method and a particle filter.

125. A method as claimed in claim 123, in which the signal extraction is performed by one of a Kalman filter and an extended Kalman filter.

126. A method as claimed in claim 122, in which at least one of the desired signals is extracted by maximum likelihood.

127. A method as claimed in claim 122, in which at least one of the desired signals is extracted by a last squares fit.

128. A program for controlling a computer to perform a method as claimed in claim 100.

129. A carrier containing a program as claimed in claim 128.

130. A computer programmed by a program as claimed in claim 128.

* * * * *